(12) United States Patent
Holland et al.

(10) Patent No.: US 7,498,278 B2
(45) Date of Patent: Mar. 3, 2009

(54) ABRASION-RESISTANT SHEET MATERIAL

(75) Inventors: John E. Holland, Bailey, NC (US); Connie W. Holland, Bailey, NC (US); Huy X. Nguyen, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 965 days.

(21) Appl. No.: 10/616,790

(22) Filed: Jul. 10, 2003

(65) Prior Publication Data

US 2005/0176320 A1 Aug. 11, 2005

Related U.S. Application Data

(63) Continuation-in-part of application No. 10/359,796, filed on Feb. 6, 2003, now abandoned.

(51) Int. Cl.
*B32B 27/04* (2006.01)

(52) U.S. Cl. .................... 442/148; 428/423.7

(58) Field of Classification Search ................. 442/148, 442/172, 174; 428/423.7; 180/116
See application file for complete search history.

(56) References Cited

U.S. PATENT DOCUMENTS

| | | | |
|---|---|---|---|
| 3,211,246 A | 10/1965 | Lewis | 180/7 |
| 3,502,168 A | 3/1970 | Jones | 180/127 |
| 3,511,331 A * | 5/1970 | Landry | 180/127 |
| 3,532,179 A | 10/1970 | McCreary | |
| 3,618,695 A | 11/1971 | Wheeler | 180/128 |
| 3,661,692 A | 5/1972 | Berczi | 161/89 |
| 3,866,707 A | 2/1975 | Paoli | 180/127 |
| 3,966,012 A * | 6/1976 | Crewe | 180/127 |
| 4,096,921 A | 6/1978 | Guienne | 180/121 |
| 4,107,369 A | 8/1978 | Gardner | 428/246 |
| 4,176,729 A | 12/1979 | Down | 180/127 |
| 4,236,593 A | 12/1980 | Wheeler | 180/128 |
| 4,248,320 A | 2/1981 | Wheeler | 180/128 |
| 4,279,322 A | 7/1981 | Wheeler et al. | 180/128 |
| 4,303,034 A | 12/1981 | Tattersall | 114/67 A |
| 4,312,690 A | 1/1982 | Wheeler | 156/253 |
| 4,337,106 A | 6/1982 | Wheeler | 156/228 |
| 4,339,017 A | 7/1982 | Payne | 180/127 |
| 6,280,546 B1 | 8/2001 | Holland et al. | 156/85 |
| 6,860,218 B2 * | 3/2005 | Eagles et al. | 114/256 |
| 2003/0019418 A1 * | 1/2003 | Romanski et al. | 114/256 |

FOREIGN PATENT DOCUMENTS

| | | |
|---|---|---|
| GB | 2276935 | 10/1994 |
| GB | 1486122 | 9/1997 |
| JP | 11115101 | 4/1999 |
| WO | WO 01/96111 | 6/2001 |

* cited by examiner

*Primary Examiner*—Arti Singh
(74) *Attorney, Agent, or Firm*—Bruce Bradford

(57) ABSTRACT

An abrasion-resistant skirt material for use with air cushion vehicles having at least one air chamber. The sheet material comprises a fabric base comprising yarns of an ultra-high molecular weight polyethylene. A bonding layer, comprising a thermoplastic material is bonded to the fabric base, and an outer layer, comprising a rubber compound is bonded to the bonding layer.

28 Claims, 3 Drawing Sheets

Figure 3

| Material | Weight (g) | 0 Weight Loss (g) | Weight Loss (%) | Weight (g) | 1000 Weight Loss (g) | Weight Loss (%) | Weight (g) | 5000 Weight Loss (g) | Weight Loss (%) | Weight (g) | 10,000 Weight Loss (g) | Weight Loss (%) | Weight (g) | 40,000 Weight Loss (g) | Weight Loss (%) |
|---|---|---|---|---|---|---|---|---|---|---|---|---|---|---|---|
| Current Soft Rubber | 27.933 | 0 | 0 | 27.497 | 0.436 | 1.156 | 25.488 | 2.445 | 8.753 | 21.932 | 6.001 | 21.48 | 17.406 | 10.53 | 37.69 |
| Coated SPECTRA® | 7.353 | 0 | 0 | 7.162 | 0.191 | 2.598 | 6.8 | 0.553 | 7.521 | 6.622 | 0.731 | 9.942 | 5.74 | 1.613 | 21.94 |
| Present Invention # 1 | 18.823 | 0 | 0 | 18.603 | 0.22 | 1.169 | 18.532 | 0.291 | 1.546 | 18.417 | 0.406 | 2.157 | 17.819 | 1.004 | 5.334 |
| Present Invention # 2 | 17.476 | 0 | 0 | 17.342 | 0.134 | 0.767 | 17.286 | 0.19 | 1.087 | 17.124 | 0.352 | 2.014 | 16.438 | 1.038 | 5.94 |

Abrasion Cycles

ABRASION-RESISTANT SHEET MATERIAL

RELATED APPLICATIONS

This is a continuation-in-part of application Ser. No. 10/359,796, filed Feb. 6, 2003, now abondoned, the content of which is hereby incorporated herein in its entirety.

FIELD OF THE INVENTION

The present invention relates to an abrasion-resistant sheet material. This sheet material finds utility in the field of air cushion vehicles, especially as lightweight skirt assemblies for air cushion vehicles, and other applications where abrasion resistance is a necessary performance characteristic.

BACKGROUND OF THE INVENTION

Numerous efforts have been advanced over the years to combat the abrasive wear and tear of items subject to abrasive contact with hard surfaces, or with moving matter such as water or flying debris. In particular, a number of sheet materials have been developed to wrap-around items to be protected or to cover exposed surfaces. Other types of sheet material are directed at preventing harmful exposure to items being stored or transported in large containers.

One application of such materials is in air cushion transport vehicles and air flotation devices of the type in commercial use today. These vehicles and devices generally operate on the principle of providing a downwardly directed airflow against a ground or water surface. This downwardly directed airflow results in a lifting force, creating a "hover" or "ground effect". An example of a vehicle of this type is an air cushion vehicle known as the HOVERCRAFT™. While there are many types of these vehicles, they each operate under the same general principles. A system is generally employed to provide an air cushion that supports a load, i.e., the weight of the vehicle and its cargo, just above ground or water level. This system typically comprises multiple high-volume, high-pressure fans that effectively pressurize the air held beneath the vehicle with enough force to lift the vehicle just above the surface over which the vehicle is positioned. A separate motive source, comprising fans or turbines, then propels the vehicle over the surface of the ground or water.

Air cushion vehicles typically include a skirt around the base, or rigid support frame, of the vehicle to enclose and form the air cushion. One portion of the skirt forms an inflatable bladder, or bag member, that is stiffened when inflated, but yet is open at the bottom. The skirt may also include a plurality of contiguous skirt elements, known as "fingers", depending downwardly from the bladder. The fingers provide auxiliary bladders and help direct the pressurized air beneath the frame of the vehicle.

Skirts have conventionally been made of reinforced (Nylon) rubber, both natural and synthetic. A particular problem, however, with air cushion vehicle skirts is their susceptibility to damage and rapid deterioration due to constant impingement by water or foreign objects. When these vehicles are operated over land, the bottom edges of the skirts are subjected to severe abrasion and wear rapidly. Further, when used in a salt-water environment, rapid deterioration of the skirt material necessitates frequent replacement of the skirt after only a few operating hours, and at substantial costs.

Numerous attempts have been made to construct more durable, longer-lasting skirts, but these have proven unsatisfactory for one reason or another. In one skirt construction, apertured flexible sheets formed from a reinforcing fabric with an elastomeric protective material have been tried. In another, a molded seamless skirt has been formed from a high strength woven aramid (KEVLAR® brand) fabric, but based upon experimentation, KEVLAR® cannot withstand saltwater attack and ultraviolet light, and wicks when exposed to water. Steel wire has also been woven into some conventional fabric constructions, but has not resulted in any appreciable reduction in wear or longevity of the skirt.

At present, the average skirt installed on air cushion vehicles operated by the United States Navy must be replaced at least every 100 to 200 operating hours. Additionally, the fabric conventionally used in such air cushion vehicles is formed of a soft rubber composition that weighs at least 80 ounces (2240 grams) per square yard. One serious problem with this construction is that it has a low resistivity to abrasion. When subjected to the standardized Taber Abrasion Resistance Testing, the rubber assembly rapidly exhibited loss of base material. For example, in representative testing, over 37 percent (weight) of the rubber skirt material was lost after 40,000 abrasion cycles. As a result, these skirts must be replaced frequently which adversely affects the operational readiness of these military vehicles.

A recent development by one of the applicants of the present invention is a lightweight skirt assembly that comprises a sheet material formed of woven ultra-high molecular weight polyethylene (UHMWPE) that is coated with an abrasion resistant thermoplastic film such as ethylene vinyl acetate (EVA). This construction, when subjected to the same abrasion resistance testing, lost only about 22 percent of its total weight. While this construction provides a substantial increase in the service life of skirt assemblies for air cushion vehicles, it has some shortcomings. For instance, SPECTRA® yarns and fabrics, formed from a polymer of ultra-high weight average molecular weight polyethylene, have little memory; i.e., when a fabric woven from this material is bent or rolled, it tends to maintain that shape until manipulated into a different shape. Thus, when used for air cushion vehicle skirts, the skirts tend to roll up and retain their inflated shapes, even after being deflated. Further, the thermoplastic film tends to abrade from the lower portion of the skirt over time, exposing the woven fabric, which is aesthetically undesirable.

SUMMARY OF THE INVENTION

The present invention is directed to a multi-layer sheet material that is highly abrasion-resistant, as well as cut and/or puncture-resistant. The fabric described herein may be employed in a variety of applications where these characteristics of a lightweight (about ⅓ less than conventional rubber) sheet material are desired. One specific application is directed to skirts formed from the sheet material, for air cushion vehicles that are lighter weight and require less frequent replacement. The skirt assemblies are constructed from a unique multi-layer sheet material comprising a fabric base layer, an intermediate layer, and a thin rubber outer layer.

The protective sheet material is flexible, air impermeable, relatively lightweight, and can be cut and formed into the bladder, fingers, aprons, or other skirt portions for installation on air cushion vehicles. The base layer serves as both a lightweight, flexible, reinforcing "frame" or "base" upon which the balance of the sheet material is constructed, and protects the integrity of an air cushion vehicle skirt by being highly cut and/or puncture resistant. In the preferred embodiment, the base layer is a fabric woven from ultra high molecular weight polyethylene fibers.

The intermediate layer is a material that is compatible with and will bond both the base layer and the outer layer together, and will not easily delaminate or wick under operational conditions. In constructing the sheet material of the present invention, the intermediate layer is a thermoplastic film that is first bonded to the base layer of fabric. An appropriate base layer and intermediate layer is disclosed in U.S. Pat. No. 6,280,546 to Holland et al. This patent describes a cut and puncture resistant laminated fabric comprising a thermoplastic film adhered to a fabric woven from ultra-high molecular weight polyethylene. The thermoplastic film is laminated under heat and pressure to the woven fabric. This fabric is described as being useful in the manufacture of such products as cut-resistant gloves and aprons, cargo container covers, bulk mail bags, and the like.

Weight and durability are factors that must be properly balanced for air cushioned vehicle operation. Heretofore, greater durability has meant heavier rubber constructions and, therefore, greater fuel costs, but with reduced load-carrying capabilities. Even with such heavier materials, skirts must still be replaced more frequently than is economical, or operationally desirable.

While not previously appreciated, it has now been found that the thermoplastic film described in Holland et al. will bond to both ultra-high molecular weight polyethylene and to certain rubber compounds, materials that themselves do not have a bonding affinity for one another. In particular, it has been found that a rubber outer layer can be bonded to the thermoplastic film when subjected to the curing process described in detail hereinbelow. The resulting multi-layer sheet construction provides a highly durable protective sheet that will better withstand the wear and tear inherent in marine and over-ground applications for air cushion vehicles. When subjected to a standardized test widely known as the Taber Abrasion Resistance Testing, the sheet construction of the present invention lost less than 6 percent of its total weight after 40,000 abrasion cycles (compared to 37 percent loss for conventional rubber skirt material).

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

BRIEF DESCRIPTION OF THE DRAWINGS

FIG. 3 is a table that compiles exemplary Taber Abrasion Resistance Test results.

DETAILED DESCRIPTION OF THE PREFERRED EMBODIMENTS

Figure 1:
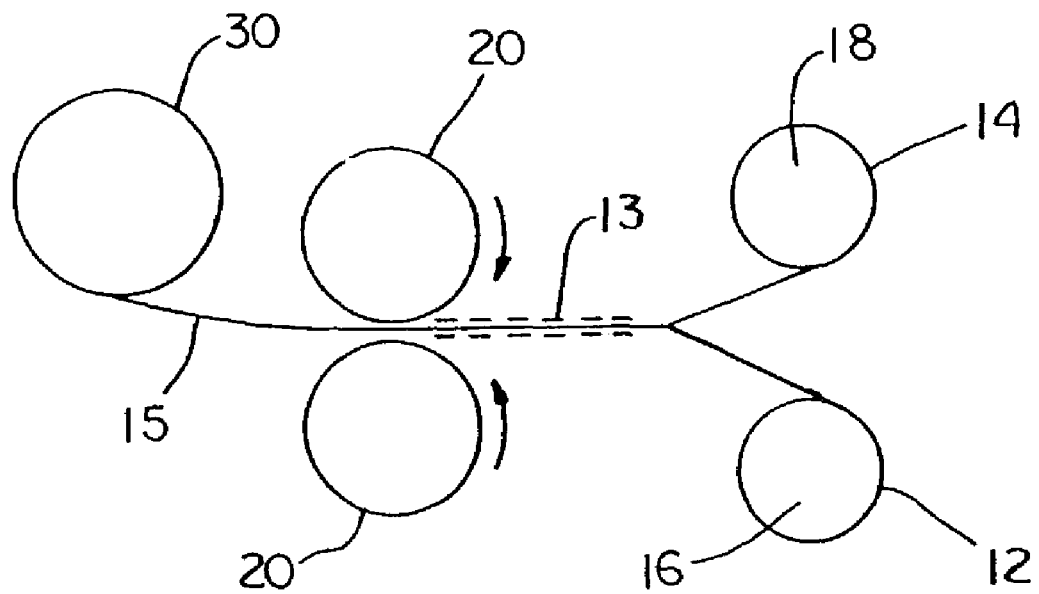
FIG. 1 is a schematic representation of the process for forming the abrasion-resistant sheet material of the present invention.

Abrasion-resistant fabrics have many uses. One such use is in flexible skirts for air cushion vehicles. The skirts or skirt assemblies, or portions thereof, enclose, or create, an air cushion volume beneath the vehicle during operation. Among the applications that may be contemplated, the present invention is directed to a highly abrasion-resistant sheet material that is quite suitable for forming flexible skirt assemblies for air cushion vehicles. The sheet material comprises a plurality of layers, including a fabric base layer, a bonding layer, and an outer layer. Each of these layers is described in detail below.

It has been found that a fabric constructed at least in part of high performance yarns formed from ultra-high molecular weight polyethylene fibers is highly desirable for use as the base layer for the sheet material of the present invention. In particular, the fabric is woven at least in part from yarns of high-strength, ultra-high molecular weight polyethylene fibers, commercially available under the SPECTRA® trademark from Honeywell International Inc. It has been found that the use of SPECTRA® fibers provides several advantages: (1) It provides a reinforcing framework upon which the other layers of the sheet material are constructed; (2) It protects the integrity of the skirt assembly formed therefrom against abrasion, puncture and tearing; (3) The fabric does not wick when its uncoated edges are exposed to or submerged in water. This prevents breakdown of the sheet material during operation.

The fabric of one embodiment of the present invention is formed primarily from SPECTRA® fiber-containing yarns woven with between about 17 and 35 ends per inch in both the warp and fill directions. The yarns are preferably each between about 650 and 1200 denier. The result is a woven fabric weighing between about 5 and 11 ounces per square yard. The following table provides fabric constructions that have been found suitable for use in forming the inner fabric base layer of the skirt assemblies of the present invention. As those skilled in the art will appreciate, the fabric constructions described here are exemplary only and not intended to limit the invention thereto. Each of these uncoated fabrics is available from Hexcel Schwebel of Anderson, S.C., and is made from SPECTRA® 900 fiber:

| Style | Weave | Weight (Oz/Yd$^2$) | Thickness (Inches) | Counts (Ends/Inch) | Yarn Denier (Warp/Fill) |
|---|---|---|---|---|---|
| 902 | Plain | 5.5 | 0.018 | 17 × 17 | 1200/1200 |
| 904 | Plain | 6.3 | 0.017 | 35 × 35 | 650/650 |
| 952 | Plain | 6.0 | 0.017 | 34 × 34 | 650/650 |

As shown in the table, a plain weave fabric having 17 ends per inch of 1200 denier SPECTRA® 900 fiber in both the warp and fill directions weighs only about 5.5 ounces per square yard, but has a breaking strength of greater than 800 pounds force per inch in both directions. The heaviest fabric construction shown in the table and used in constructing the skirt assemblies of the present invention is a plain weave comprising 35 ends per inch, warp and fill, of 950 denier yarns. This heavier construction weighs only about 6.3 ounces per square yard. In addition to the plain weave constructions shown in the table, a 4×4 basket weave comprising 34 ends per inch of 1200 denier yarns, warp and fill, and weighing 10.7 ounces per square yard, has also been found suitable.

Preferred bonding materials for the bonding layer are films of olefin polymers or copolymers having a melting point or melting point range less than about 140° C., particularly ethylene polymers and copolymers (e.g., ethylene/propylene copolymers). Melting point is determined, for example, by differential scanning calorimetry (DSC) at a heating rate of 10° Centigrade per minute. The most preferred bonding materials are low density polyethylene (LDPE), ethylene vinyl acetate (EVA) and LDPE/EVA copolymers. The bonding layer can be applied in any suitable form, although film is particularly preferred. Film can be used to coat and bond to the high performance fabric base described hereinabove, while creating the intermediate bonding layer. EVA bonds well to fabric woven from yarns containing high-strength, ultra-high molecular weight polyethylene fibers. It provides an additional level of abrasion-resistance and creates a substantially water and air impermeable coated fabric. Heretofore, however, it has not been known that EVA could act as a bonding medium between dissimilar materials. As described hereinbelow, it has now been found that EVA is a highly satisfactory intermediate bonding layer that has a bonding affinity for both the inner fabric base layer of ultra-high molecular weight polyethylene and the outer protective layer of a rubber compound. While a thickness of up to 40 mils is possible, it has been found that a thermoplastic film laminate of between about 4 and 15 mils thickness on each side of the fabric (where abrasion resistance protection on both sides is desired) provides the most suitable flexible sheet construction. In particular, it has been found that a film thickness on each side of between about 4 mils and 10 mils is most desirable when the EVA is used as an intermediate bonding layer. Polyethylene and ethylene vinyl acetate films each weigh about one ounce per mil of thickness per square yard. Thus, a 4 mil laminate on both sides of the fabric sheet adds only about 8 ounces (4 ounces on each side) to the total weight per square yard.

Figure 2:
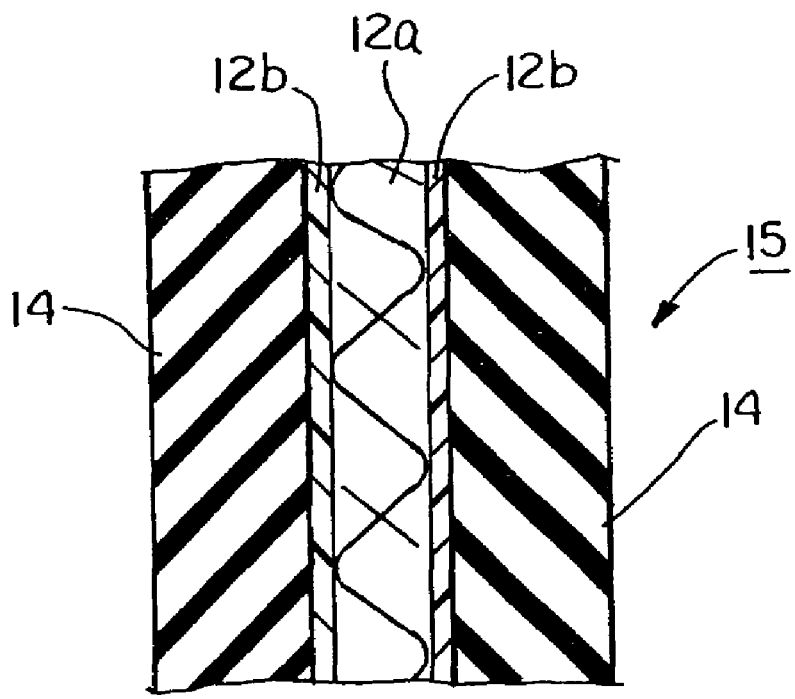
FIG. 2 is a cross-sectional view of the sheet material formed according to the present invention.
Figure 4A:
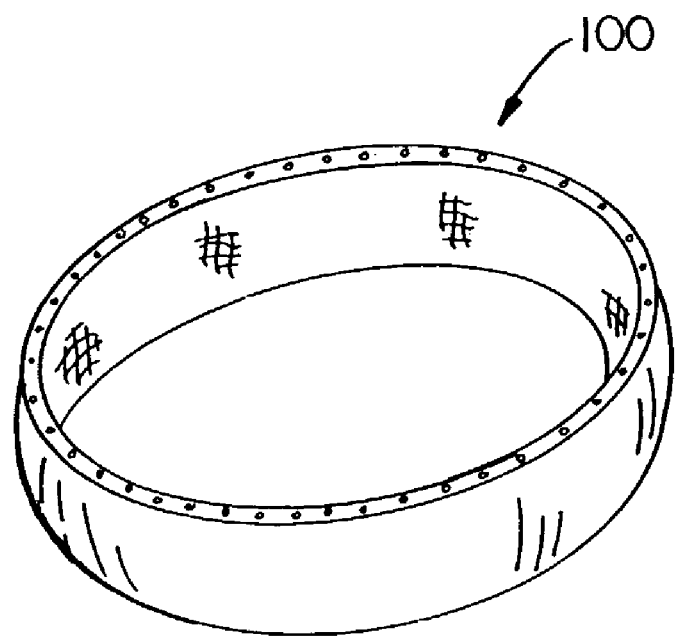
FIGS. 4A and 4B show an exemplary air cushion vehicle skirt construction.
Figure 4B:
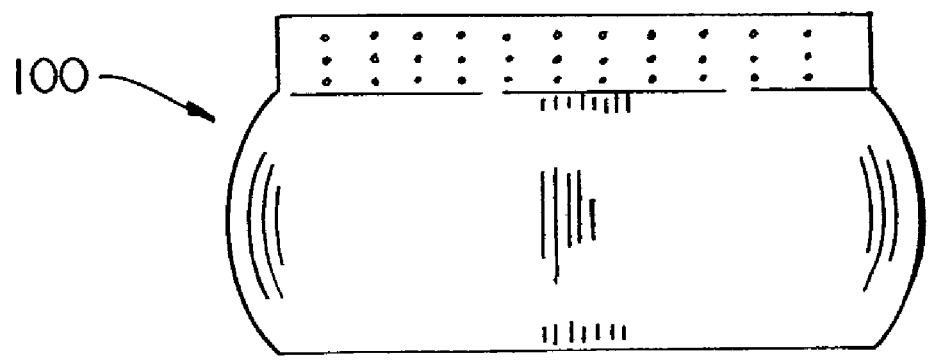

Turning now to FIGS. 1 and 2, the abrasion-resistant sheet material of the present invention is illustrated in cross-section. Having first coated the woven fabric with the thermoplastic film in accordance with the teachings of U.S. Pat. No. 6,280,546 to Holland et al., the final sheet-forming process of the present invention may be conducted using a three-step process. The first step includes first tacking the EVA-coated fabric 12 to a raw rubber compound sheet 14. The coated fabric 12 is supplied from a roll 16, while the uncured rubber sheet 14 is supplied from roll 18 on a continuous basis. A calender roll 20 presses the two sheets 12, 14 together to form a lightly covered sheet. The process illustrated in FIG. 1 is exemplary of a finished sheet material that is coated only on one side with the rubber compound of the present invention. As those skilled in the art will appreciate, the process is easily modified where the rubber coating is desired on both sides of the sheet material (FIG. 2).

The rubber compound forming the outer layer 14 comprises natural rubber and styrene butadiene. It has also been found that a rubber compound further including natural rubber, styrene butadiene, and polybutadiene, or natural rubber and polybutadiene is also suitable for forming the outer layer 14. The following table summarizes some of the exemplary compounds that have been found to provide highly suitable abrasion resistance. Each of these formulations is available from Specialty Tires of America of Indiana, Pennsylvania.

| Formulation | Natural Rubber | Styrene Butadiene | Polybutadiene |
|---|---|---|---|
| 2148 | 80% | 20% | 0% |
| 2160 | 66% | 14% | 20% |
| 2141 | 75% | 0% | 25% |
| 2170 | 25% | 35% | 40% |

Unlike the neoprene currently used to form skirt assemblies for air cushion vehicles, the rubber compound formulations of the present invention are of the type used in the manufacture of vehicle tire treads. These rubber compound formulations 10 are obtained as uncured (B-Stage) raw compounds. Once cured, the resulting rubber is substantially harder than the material presently in use, but still substantially thin and flexible. The rubber sheet 14 is between about 5 mils and 50 mils thick, and desirably about 30 mils thick. A release paper 13 is desirably used to maintain the consistent application (thickness) of the uncured rubber sheet 14 to the coated fabric 12.

A suitable machine for tacking the rubber compound sheet 14 to the coated fabric is the Van Vlandrin Silk Calender with a husk soft roll and a steel center roll. Unlike some calendering processes, there is little or no heat applied during the tacking step, to avoid premature curing of the rubber sheet 14. Once the coated fabric 12 is initially adhered to the rubber sheet 14, it can be separated therefrom easily until heated and cured. Because the rubber sheet 14 is uncured, i.e., "tacky", the underlying coated fabric inner layer is important in providing support and underlying structure for the uncured rubber sheet 14. In this condition the rubber and coated fabric combination is not suitable for the proposed end uses contemplated for the present invention.

After the coated fabric 12 and rubber sheet 14 have been tacked together, the combination 15 is wound into a bundle 30 around a core 40 with an appropriate release paper between the windings, and secured with a heat resistant tape. The release paper 13 is positioned so as to be directly adjacent the paper core 40 during windup. There is no requirement, however, that the coated fabric 12 and rubber sheet 14 be wound into a roll. Alternatively, the coated fabric 12 and rubber sheet 14 could be collected and moved along an elongate collection device such as a continuously moving conveyor-type belt. It is important, however, that the roll 30, or other collection device, be continuously rotated/rolled during the curing/baking process. This is necessary since the initially uncured rubber sheet 14 will tend to slough or sag under its own weight during the initial hours of the curing process. By continuously rotating the roll, the uniformity of cure and the thickness of the final outer protective layer 14 are assured.

Next, the bundle 30 is baked in an oven for between about 4 hours and 24 hours at a temperature between about 230-280° F. (about 110-138° C.). As will be appreciated by those skilled in the material arts, lower curing temperatures require a longer duration to sufficiently complete the curing of the rubber sheet 14.

Referring again to FIG. 2, a cross-sectional view of the abrasion-resistant flexible sheet 15 is shown in detail. The woven fabric 12a is shown coated on both sides with thermoplastic film 12b and rubber sheet 14. Once the laminated sheet material 15 has been formed, it can be conventionally cut and shaped to form any of the exemplary skirt assemblies illustrated herein.

Samples of the abrasion-resistant sheet material formed according to the above process were subjected to the Taber® Abrasion Resistant Test. This test is well known in the testing arts and is commonly used to test the abrasion resistance of solid materials, painted items, and coated items, including textile fabrics. To perform the test, a Taber Model 5150 Digital Abraser, with Type H18 (medium coarse) abrasion wheels, was used. This precision instrument, available from Taber Industries of North Tonawanda, New York, is designed to measure the resistance of surfaces to rubbing abrasion. Rub-wear action is produced by the contact of a test sample turning on a vertical axis, against the sliding rotation of two abrading wheels. Before performing the testing, all test specimens must be conditioned at least 24 hours in an atmosphere that is about 70° F. (about 21° C.) and about 65 percent relative humidity as specified in ASTM D1776, Standard Practice for Conditioning and Testing Textiles.

Material specimens are first cut into 3 inch diameter discs and weighed. The testing is commenced on each sample with a standard 1000 g load on the abrasion wheels. The testing is performed in 1000 cycle increments. After each 1000 cycles, any loose material is vacuumed from the samples and the abrasion wheels, and the abrasion wheels are refaced with sand paper, as necessary. The test specimens are weighed, and testing continues until the test specimens have been subjected to 40,000 abrasion cycles. At the conclusion of the testing the samples are again weighed and the total weight loss is calculated according to the following formula: % Weight Loss=$100 \times (W_{START} - W_{END})/W_{START}$. Results of testing are shown in FIG. 3. For comparative purposes, the currently used soft rubber skirt material, EVA coated fabric woven from SPECTRA® 900 fiber, and the composite sheet material of the present invention were each tested under identical testing conditions. After 10,000 abrasion cycles, the currently used skirt material exhibits over 21 percent total weight loss. The sheet material (Fabrics 1 and 2) of the present invention, however, exhibit an average total weight loss of only about 2.1 percent. When testing is continued for 40,000 abrasion cycles, the currently used skirt material exhibits almost 38 percent total weight loss. The sheet material of the present invention, however, exhibits an average weight loss of only about 5.6 percent, or less than one-sixth the total weight loss of the currently used skirt material.

Further testing has been conducted, for comparative purposes, to determine the number of abrasion cycles that the same skirt materials can withstand until failure. Failure is defined as a complete through-wall penetration of the skirt material. The following table summarizes the test results. As shown in the table, the formulations of the present invention can withstand approximately 2.4 to 5.5 times as many cycles as the skirt material in current use, and approximately 1.9 to 4.4 times as many cycles as skirt material constructed from EVA-Coated SPECTRA® alone.

| Material | Cycles at Failure |
| --- | --- |
| Nylon/Rubber | 43,000 |
| EVA-Coated SPECTRA ® | 52,479 |
| Formulation 2148 | 102,730 |
| Formulation 2160 | 174,000 |
| Formulation 2170 | 230,000 |
| Formulation 2141 | 238,000 |

Although the present invention has been described with exemplary constructions, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. An abrasion-resistant skirt material for use with air cushion vehicles having at least one air chamber, said sheet material comprising:
   (a) a woven fabric base, comprising yarns of an ultra-high molecular weight polyethylene;
   (b) a bonding layer, comprising a thermoplastic material bonded to the fabric base; and
   (c) an outer layer, comprising a rubber compound bonded to the bonding layer.

2. The skirt material of claim 1 wherein the rubber compound is selected from the group of compounds consisting of natural rubber and styrene butadiene; natural rubber and polybutadiene; and natural rubber, styrene butadiene, and styrene polybutadiene.

3. The skirt material of claim 2 wherein the outer layer is between 5 mils and 50 mils thick.

4. The skirt material of claim 3 wherein the outer layer is about 30 mils thick.

5. The skirt material of claim 1 wherein the base fabric is coated on each side with the bonding layer and the durable rubber compound.

6. The abrasion-resistant skirt of claim 1 wherein the inner fabric base weighs between about 5 and 11 ounces per square yard, comprises between about 17 ends and 35 ends per inch in both the warp and fill directions, and wherein each of the warp and fill ends are between about 650 and 1200 denier.

7. The abrasion-resistant skirt of claim 1 wherein the thermoplastic material is formed of an olefin polymer or copolymer having a melting point less than about 140 degrees C.

8. The abrasion-resistant skirt of claim 7 wherein the thermoplastic material is selected from the group consisting of polyethylene, ethylene vinyl acetate, and combinations thereof.

9. The skirt material of claim 1 wherein when tested in accordance with the Taber Abrasion Resistance Test (H-18 Wheel and 1000 g load) retains at least about 98 percent of its original weight after 5,000 abrasion cycles.

10. The skirt material skirt assembly of claim 1 wherein when tested in accordance with the Taber Abrasion Resistance Test (H-18 Wheel and 1000 g load) retains at least about 95 percent of its original weight after 10,000 abrasion cycles.

11. The skirt material of claim 1 wherein when tested in accordance with the Taber Abrasion Resistance Test (H-18 Wheel and 1000 g load) retains at least about 90 percent of its original weight after 40,000 abrasion cycles.

12. The skirt material of claim 2 wherein the rubber compound comprises about 80 percent by weight natural rubber and about 20 percent by weight styrene butadiene.

13. The skirt material of claim 2 wherein the rubber compound comprises About 75 percent natural rubber and about 25 percent polybutadiene.

14. The skirt material of claim 2 wherein the rubber compound comprises about 66 percent natural rubber, 14 percent styrene butadiene, and 20 percent polybutadiene.

15. A lightweight, abrasion-resistant sheet material, comprising:
   (a) a woven fabric base, comprising yarns of an ultra-high molecular weight polyethylene;
   (b) a bonding layer, comprising a thermoplastic material bonded to the fabric base; and
   (c) an outer layer, comprising a rubber compound bonded to the bonding layer.

16. The abrasion-resistant sheet material of claim 15 wherein the rubber compound is selected from the group consisting of natural rubber and styrene butadiene; natural rubber and polybutadiene; and natural rubber. styrene butadiene, and polybutadiene.

17. The abrasion-resistant sheet material of claim 15 wherein the outer layer is between about 5 mils and 50 mils thick.

18. The abrasion-resistant sheet material of claim 17 wherein the outer layer is about 30 mils thick.

19. The abrasion-resistant sheet material of claim 15 wherein the fabric base is coated on each side with the bonding layer and the durable rubber layer.

20. The abrasion-resistant sheet material of claim 15 wherein the fabric base weighs between about 5 and 11 ounces per square yard, comprises between about 17 ends and 35 ends per inch in both the warp and fill directions, and wherein each of the warp and fill ends are between about 650 and 1200 denier.

21. The abrasion-resistant sheet material of claim 15 wherein the thermoplastic material is formed of an olefin polymer or copolynier having a melting point less than about 140 degrees C.

22. The abrasion-resistant sheet material of claim 21 wherein the thermoplastic material is selected from the group consisting of polyethylene, ethylene vinyl acetate, and combinations thereof.

23. The abrasion-resistant sheet material of claim 16 wherein the rubber compound comprises about 75 percent natural rubber and 25 percent polybutadiene.

24. The abrasion-resistant sheet material of claim 16 wherein the rubber compound comprises about 66 percent natural rubber, 14 percent styrene butadiene, and 20 percent polybutadiene.

25. The abrasion-resistant sheet material of claim 16 wherein the rubber compound comprises about 80 percent by weight natural rubber and about 20 percent hy weight styrene butadiene.

26. The abrasion-resistant sheet material of claim 15 which, when tested in accordance with the Taber Abrasion Resistance Test (H-18 Wheel and 1000 g load) retains at least about 98 percent of its original weight after 5.000 abrasion cycles.

27. The abrasion-resistant sheet material of claim 15 which, when tested in accordance with the Taber Abrasion Resistance Test (11-18 Wheel and 1000 g load) retains at least about 95 percent of its original weight after 10,000 abrasion cycles.

28. The abrasion-resistant sheet material of claim 15 which, when tested in accordance with the Taber Abrasion Resistance Test (11-18 Wheel and 1000 g load) retains at least about 90 percent of its original weight after 40,000 abrasion cycles.

* * * * *